United States Patent [19]
Sasaki

[11] Patent Number: 5,197,702
[45] Date of Patent: Mar. 30, 1993

[54] COMBINED UNIVERSAL HEAD AND GRIP
[75] Inventor: Hidemi Sasaki, Tokyo, Japan
[73] Assignee: Fuji Photo Film Co., Ltd., Kanagawa, Japan
[21] Appl. No.: 734,996
[22] Filed: Jul. 24, 1991
[30] Foreign Application Priority Data
Aug. 22, 1990 [JP] Japan ................. 2-218990
[51] Int. Cl.$^5$ ........................................... F16M 11/04
[52] U.S. Cl. ................... 248/178; 352/243; 354/293
[58] Field of Search ............ 248/178, 183, 278, 187, 248/177; 352/243; 354/293

[56] References Cited
U.S. PATENT DOCUMENTS

| 4,653,709 | 3/1987 | Paldino | 248/278 X |
| 4,655,567 | 4/1987 | Morley | 248/183 X |
| 4,728,839 | 3/1988 | Coughlan et al. | 248/183 X |
| 4,838,117 | 6/1989 | Bittner | 248/183 X |
| 4,858,864 | 8/1989 | Thompson | 248/183 X |
| 4,955,568 | 9/1990 | O'Connor et al. | 248/183 |
| 5,056,745 | 10/1991 | Gelbard | 248/278 X |

FOREIGN PATENT DOCUMENTS
62-146366  9/1987  Japan.
1243673  9/1989  Japan.

OTHER PUBLICATIONS
Popular Science (Sep., 1947-p. 226).

Primary Examiner—Ramon O. Ramirez
Attorney, Agent, or Firm—Sughrue, Mion, Zinn, Macpeak & Seas

[57] ABSTRACT

In a combined universal head and grip, the foldable grip and the base of a universal head are common and a tilt driving source and a pan driving source are installed in a body of the grip. The body of the grip has a flat surface which is substantially perpendicular to an optical axis of the camera when the grip is unfolded. According to the present invention, the video camera can be operated by remote control without using a tripod or any additional attachment.

12 Claims, 9 Drawing Sheets

COMBINED UNIVERSAL HEAD AND GRIP

BACKGROUND OF THE INVENTION

1. Field of the Invention

The present invention relates to a combined universal head and grip preferably used for a video camera.

2. Description of the Prior Art

Usually, a revolver type grip is used for a video camera so as to improve operation performance. Such grips are often foldable and are used as a handle when the grip is folded.

When a picture is taken by a conventional video camera in a remote control operation, the video camera is panned and tilted by a universal head which is electrically driven and attached on a tripod as disclosed in Japanese Utility Model Publication No. 62-146366. In the above described conventional video camera with a grip, a connecting member is provided between the grip and the universal head. The connecting member is fixed and integrally formed with the universal head via the grip.

In the above described video camera, it is necessary to employ a tripod and a battery source and other attachments in addition to the universal head, so that the volume of the necessary members becomes large and the weight thereof becomes heavy for portable use. Under the above conditions, use of the camera is made difficult.

In Japanese Patent Publication No. 1-243673, there is disclosed a video camera with a driving mechanism for panning and tilting the video camera installed in a body of the grip. In such a video camera, the grip is attached on a tripod or a similar separated supporting member, for example, a battery case or a cassette case, the tripod is integrally formed with the grip at a lower portion of the grip or a universal head of the video camera rotates horizontally by itself on a flat surface. However, under the above described conditions, some attachments are still necessary and the video camera may be driven unstably.

A purpose of the present invention is to resolve the above drawbacks and provide a combined universal head and grip which enables stable taping in a remote operation work without using any attachments.

SUMMARY OF THE INVENTION

To resolve the above described problems, in a first combined universal head and grip according to the present invention, a lower surface of a body of the camera is attached to the body of the grip which is commonly used as a base of a universal head. A driving source for driving the camera horizontally and vertically is installed at a tip portion of the body of the grip. In a second combined universal head and grip according to the present invention, a grip body is attached at a lower surface of a body of the camera. The body of the grip being used commonly as a base of the universal head. A driving source for driving the camera horizontally and vertically is installed in a tip portion of the body of the grip, and the body of the grip is foldably attached with respect to the body of the camera and an axis of folding movement of the grip and an axis of vertical movement of the video camera are used in common. In a third combined universal head and grip, the body of the grip is foldably attached with respect to the body of the camera and the shape of the body of the grip is flat and a longitudinal direction of the body of the grip is substantially perpendicular to the optical axis of the camera when the grip is unfolded.

According to a first aspect of the present invention, the body of the grip is used as the base of the universal head so that it is unnecessary to use a tripod and other attachments. Also, the driving source such as a motor of heavy weight is installed in the body of the grip, so that panning and tilting operations become more stable. According to a second aspect of the present invention, the body of the grip is foldable with respect to the body of the camera, so that it becomes easy to carry the camera. According to the above aspect of the present invention, the body of the grip has a flat surface positioned perpendicular to the optical axis of the camera when the grip is unfolded, so that the body of the grip has a shape suitable as the base of a universal head yet is easily gripped.

DETAILED DESCRIPTION OF THE PREFERRED EMBODIMENTS

Figure 1:
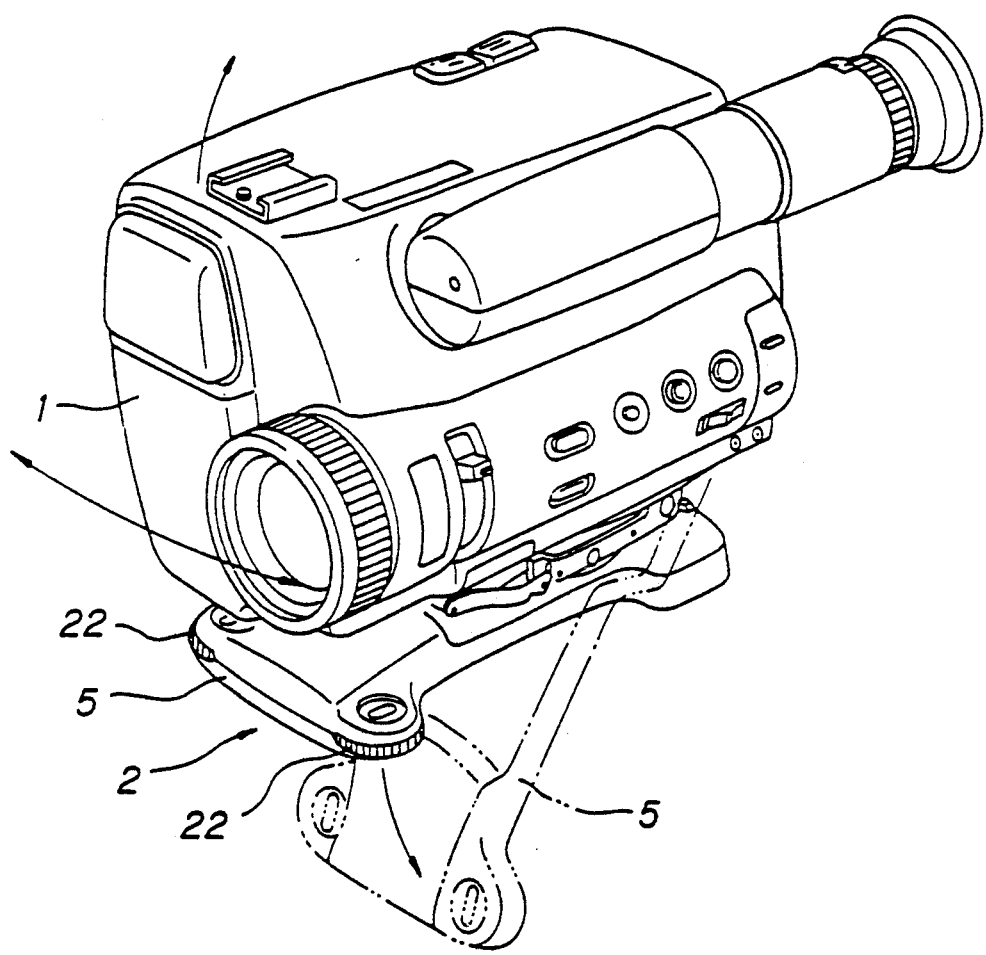
FIG. 1 shows a perspective view of the first embodiment of a video camera with a combined universal head and grip according to the present invention.
Figure 2:
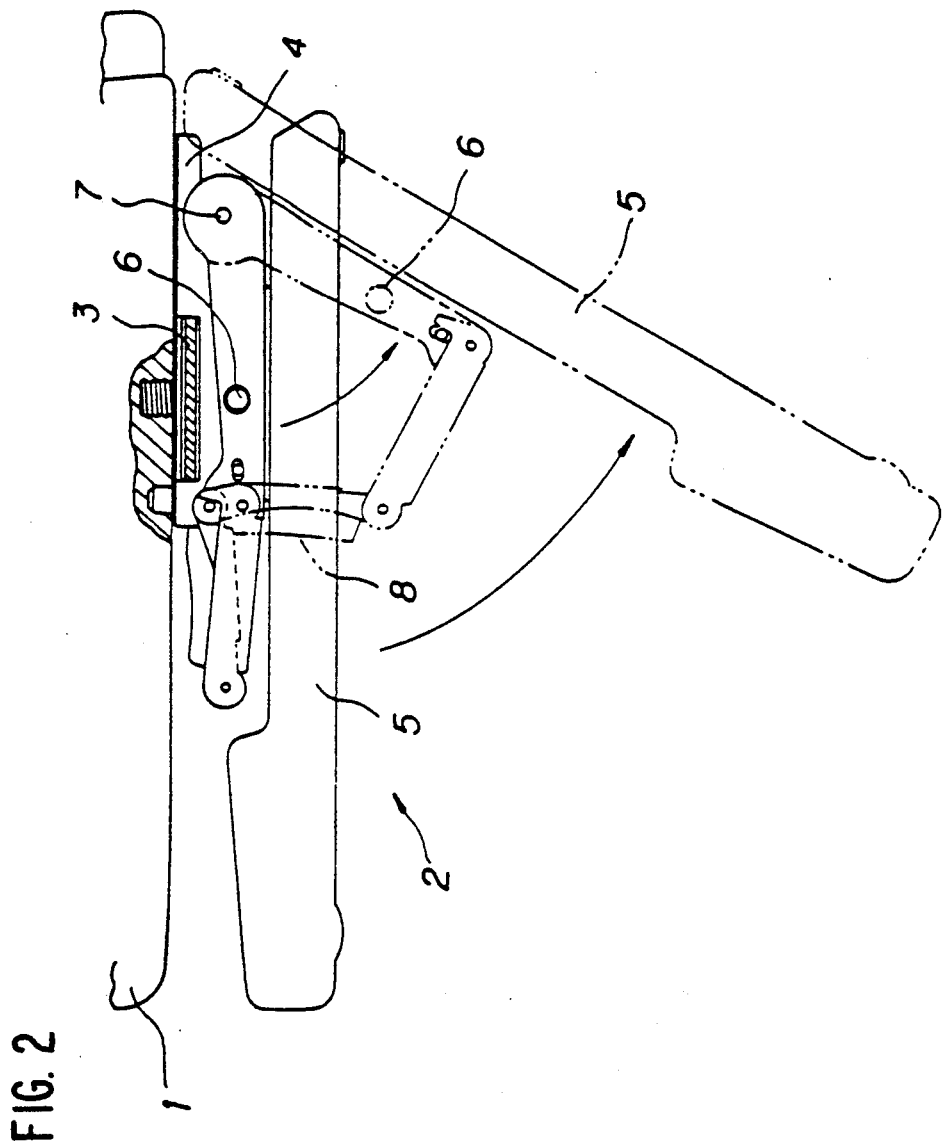
FIG. 2 shows a side view of the grip.

In FIGS. 1 and 2, numeral 1 indicates a video camera body. A combined universal head and grip (hereinafter, referred to as "the grip") 2 is attached at a lower surface of the video camera body 1 with a screw 3. The grip 2 mainly comprises a base board 4 fixed on the video camera body 1 and a body 5 rotatably mounted on the base board 4. The body 5 has a flat surface along a transverse direction positioned perpendicular to an optical axis of the camera. A locking mechanism (not shown) is released by pushing a release bottom 6. The grip body 5 is pivoted in the downward direction on a hinge pin 7 located at a tail end portion of the base board 4. Thus, the grip body 5 can be pulled down to a released condition as shown in FIG. 2. This action is performed manually by a cameraman. In the drawings, numeral 8 indicates a recording button used for normal picture-taking operations when the grip 4 is released.

Figure 3:
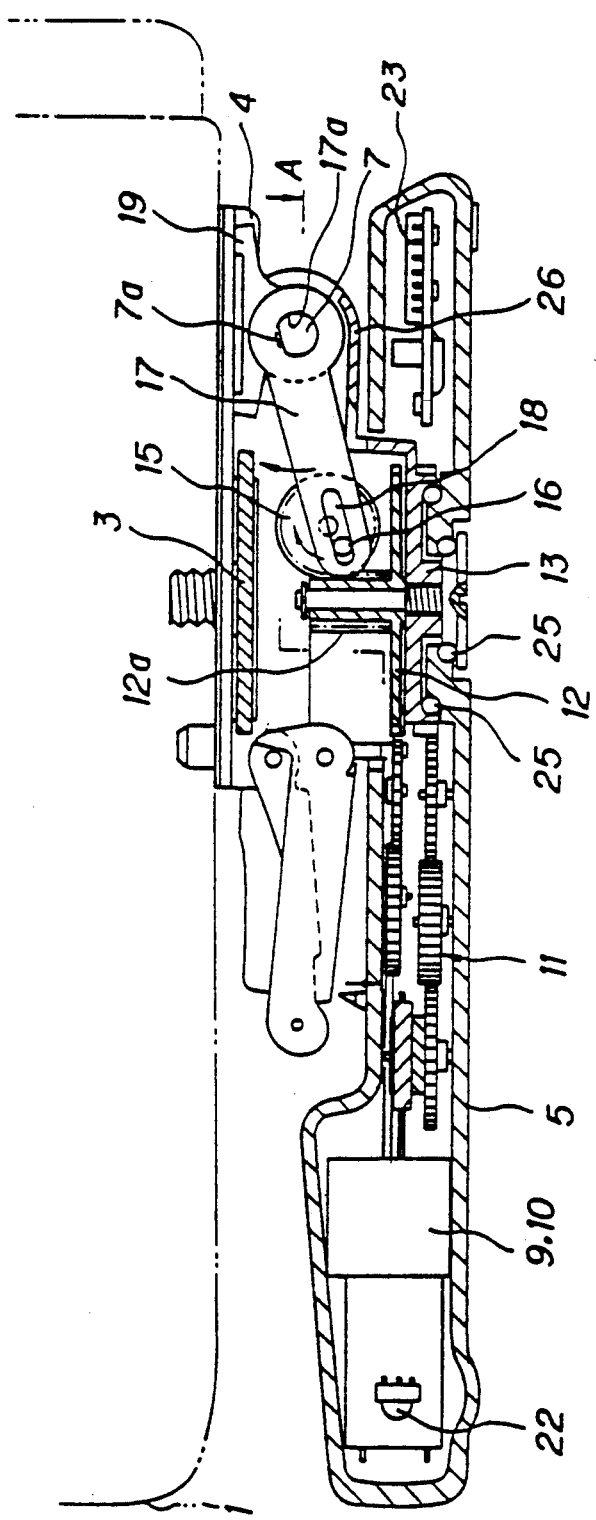
FIG. 3 shows a cross sectional view of the grip in a folded condition.
Figure 4:
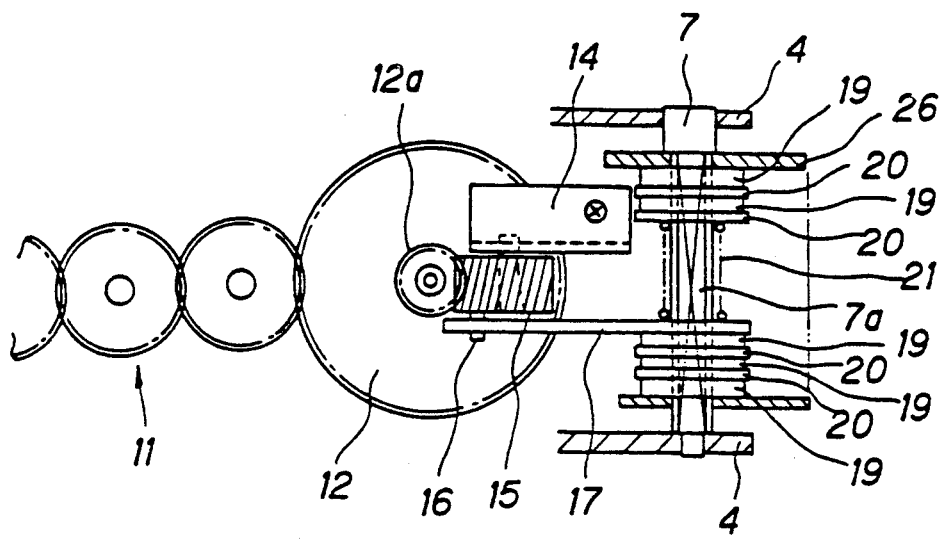
FIG. 4 is a cross sectional view of the grip along line A—A in FIG. 3.

A pan driving mechanism and a tilt driving mechanism will now be described with reference to FIGS. 3 and 4. As shown in FIG. 3, in a tip end portion of the grip body 5, an electric motor 9 for tilting the video camera 1 and an electric motor 10 for panning the video camera are installed. Driving force from these electric motors 9, 10 is transmitted to a tilt gear wheel 12 and a pan gear wheel 13 through a tilt driving force transmitting means and a pan driving force transmitting means, that is, a gear unit comprising a worm gear and a spur gear and so on. In the drawings, numeral 25 indicates balls circularly arranged at a lower surface of the pan gear wheel 13. The balls 25 hold the pan gear wheel 13 which is rotatable with respect to the grip body 5.

A tilt worm 12a is integrally formed with the tilt gear wheel 12 at an upper surface thereof. The driving force from the tilt gear unit is transmitted to a tilt worm wheel 15 rotatably supported on the base 4 via the tilt worm 12a and a bracket 14. A pin 16 is mounted on a side surface of the tilt worm wheel 15 and is engaged with a slot 18 of a tilt arm 17 engaging the hinge pin 7. When the tilt worm wheel 15 rotates clockwise, the tilt arm 17 swings clockwise and the camera body 1 is tilted upwardly. The tilt range according to this embodiment is from $-5°$ to $+5°$.

Figure 5:
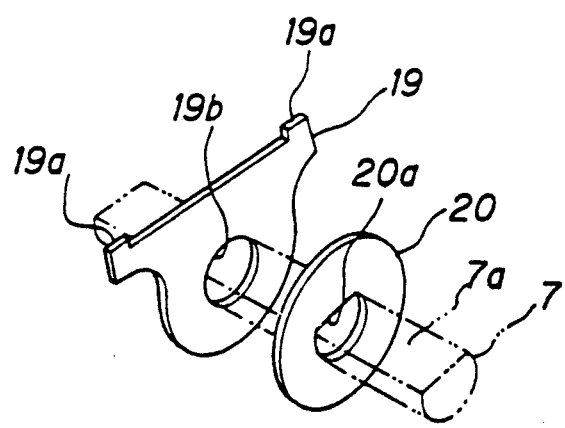
FIG. 5 shows a perspective view of a hooking collar and a clutch collar.
Figure 6:
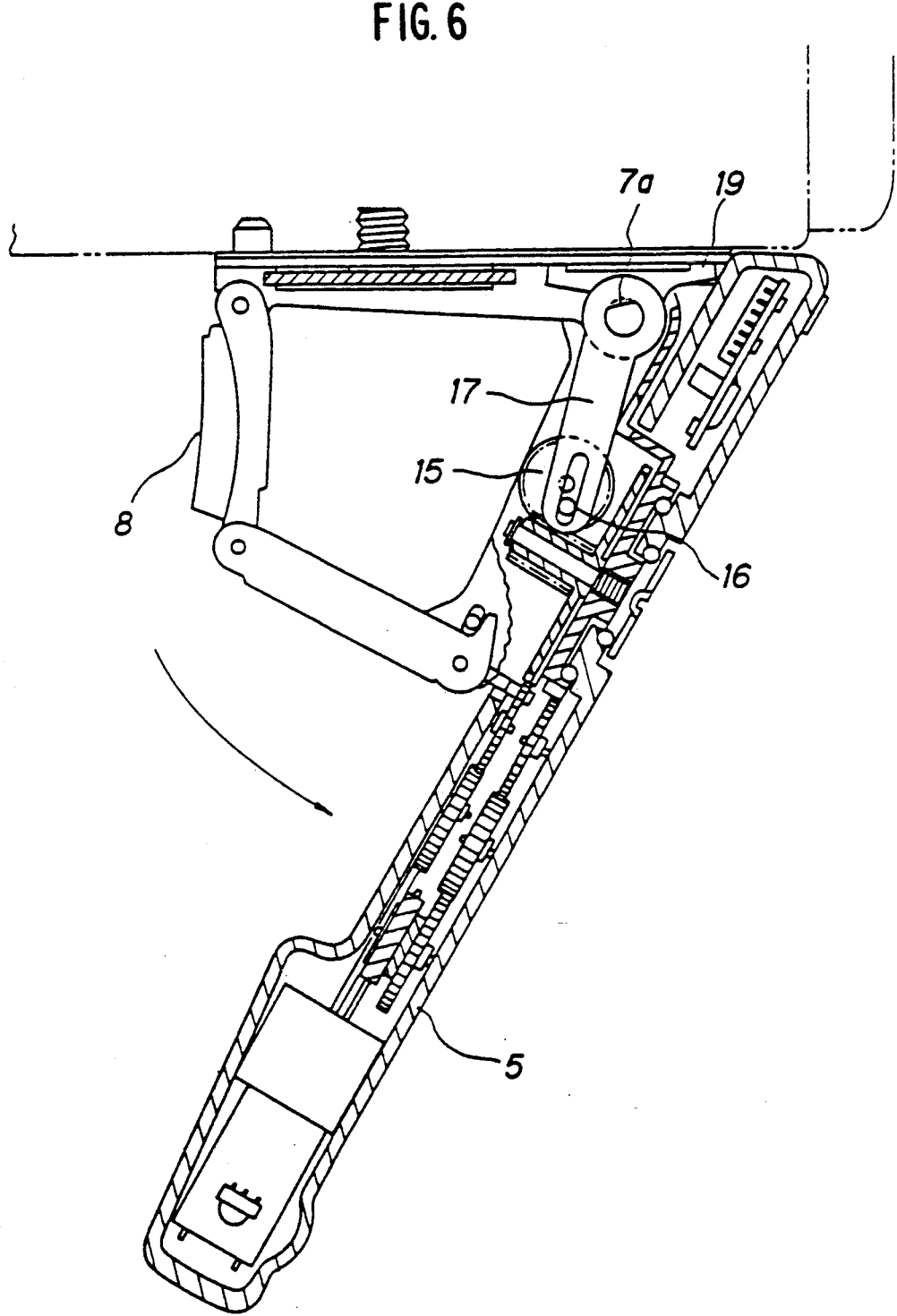
FIG. 6 is a longitudinal cross sectional view of the grip in an unfolded condition.

The hinge pin 7 has a flat portion 7a at an upper surface and the tilt arm 17 has a D-shaped hole 17a (hereinafter, referred to as "D-hole") at a tail end. The flat portion 7a and the D-hole 17a are engaged with each other and rotate integrally. In addition to the tilt arm 17, two groups of a plurality of hooking collars 19 having an engaging portion 19a and a plurality of disc shaped clutch collars 20 alternatively arranged are provided at the both end portions of the hinge pin 7 along the longitudinal direction thereof, as shown in FIG. 4. As shown in FIG. 5, each hooking collar 19 has a circular hole 19b and each clutch collar 20 has a D-shaped hole similar to the D-hole 17a of the tilt arm 17. Frictional force is produced between the hooking collars 19 and the clutch collars 20 by the spring force of a pressurized coil spring 21 located at a central portion of the hinge pin 7. That is, these members form a multi element friction clutch (hereinafter, referred to as "the clutch"). The frictional force of the clutch is strong enough to support the weight of the video camera body 1. When a tilt mechanism is actuated or the grip body 5 is manually pulled down, the clutch may be designed to slip. Accordingly, as shown in FIG. 6, even if the grip body 5 is pulled down, the tilt arm 17 is swung together with the grip body 5 and engagement of the tilt worm 12a and the tilt worm 15 is not released.

On the other hand, the pan gear wheel 13 is integrally formed with a grip base 26 at the lower surface thereof and swings with respect to the base 4 by being pivoted on the hinge pin 7. Accordingly, when the driving force from the gear unit 11 is transmitted, the base 4, that is, the video camera body 1, is panned with respect to the grip body 5.

In FIG. 3, numeral 22 indicates a light receiving portion of a remote control unit and numeral 23 indicates a control unit including a microcomputer.

When a video is taken by remote operation in the embodiment according to the present invention, the cameraman sets the video camera on a table on other support in a manner as shown in solid line in FIG. 1. Thus, a remote control (not shown) is operated, and the tilt driving electric motor 9 and/or the pan driving electric motor 10 are driven. The video camera body 1 can be tilted by pivoting on the hinge pin 7 and panned with respect to the grip body 5. If the elevation angle of the video camera body 1 is first determined by the cameraman, the camera can be tilted within a range of from $-5°$ to $+5°$ of the predetermined angle.

The tilt driving electric motor 9 and the pan driving electric motor 10 and other elements are installed in the tip end portion of the grip body 5, so that the weight of the tip end portion is relatively heavy. This allows the camera body 1 to be stably supported. In this embodiment, the grip body 5 has a flat surface along a transverse direction and a width of the tip end portion is elongated, so that the stability of the video camera is further improved. It thus becomes possible to film without blurring during tilting and panning operations of the video camera body 1 without using a tripod.

Figure 7:
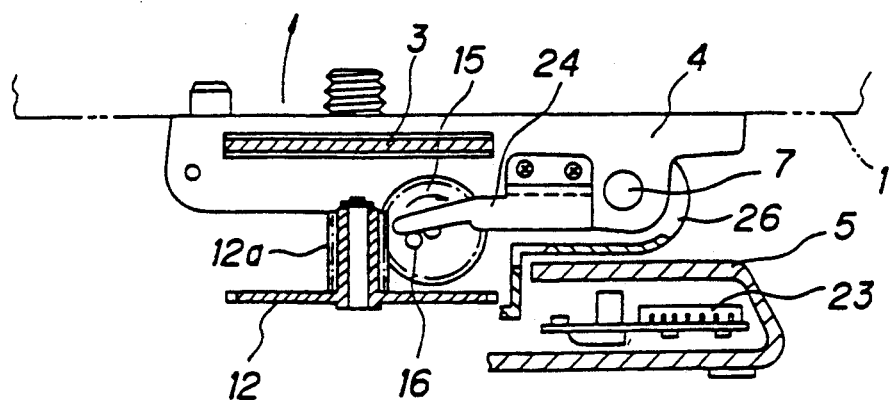
FIG. 7 is a side view of an essential part of the second embodiment of a combined universal head and grip according to the present invention.

FIG. 7 is a side view of an essential portion of a combined universal head and grip according to the second embodiment of the present invention. In the second embodiment, most of the structure is the same as in the first embodiment, except for the tilt driving mechanism. Only the differences will be described.

In the drawing, numeral 24 is a tilt arm directly mounted on base 4. In the second embodiment, when tilt worm wheel 15 is rotated, a pin 16 swings the tilt arm 24 and the base 4, that is, the video camera body 1 is tilted within a range of $-5°$ to $+5°$. The second embodiment does not employ a friction clutch mechanism, so that the video camera body 1 is horizontally set in a normal condition under its own weight and is thereafter tiltable within a range of $-5°$ to $+5°$ in the horizontal direction. In the second embodiment, the initial elevation angle cannot be set by the cameraman, thus differing from the first embodiment. However, the number of parts and number of manufacturing steps can be markedly reduced, so that the production cost can be reduced.

Figure 8:
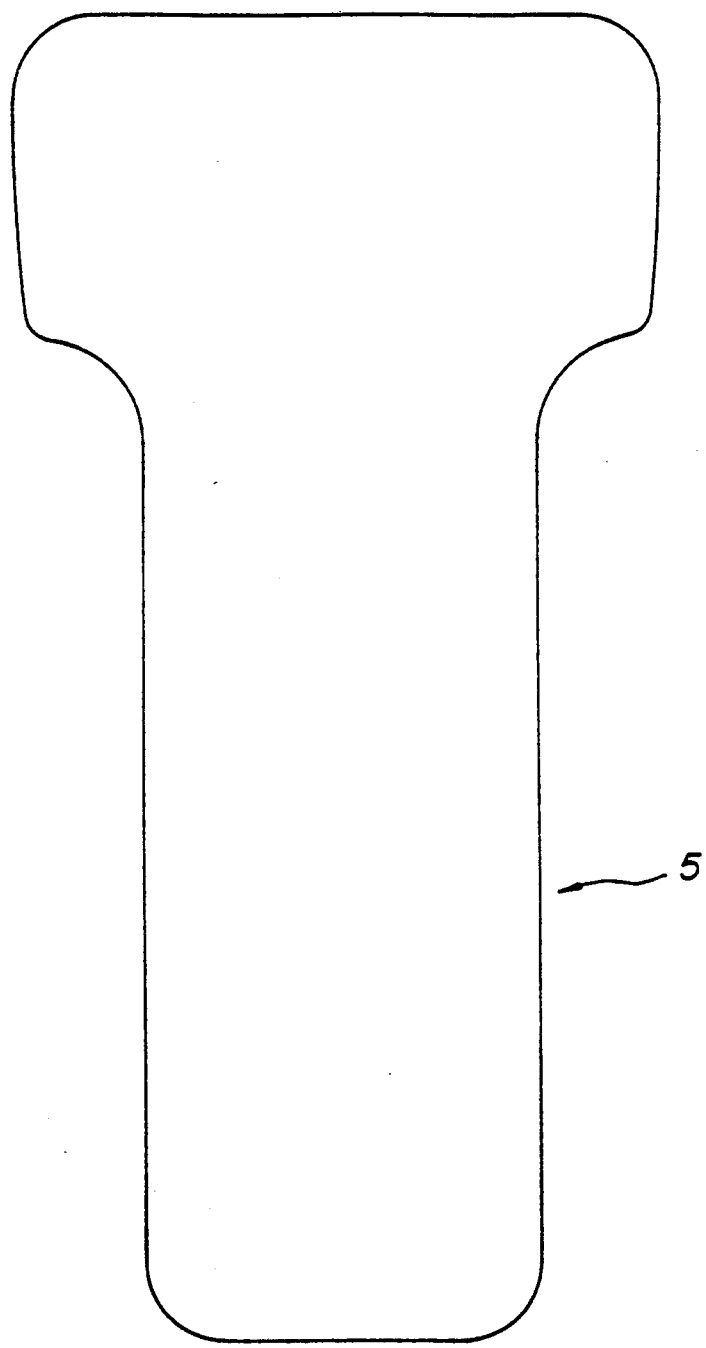
FIG. 8 is a plan view of a different embodiment of the grip.
Figure 9:
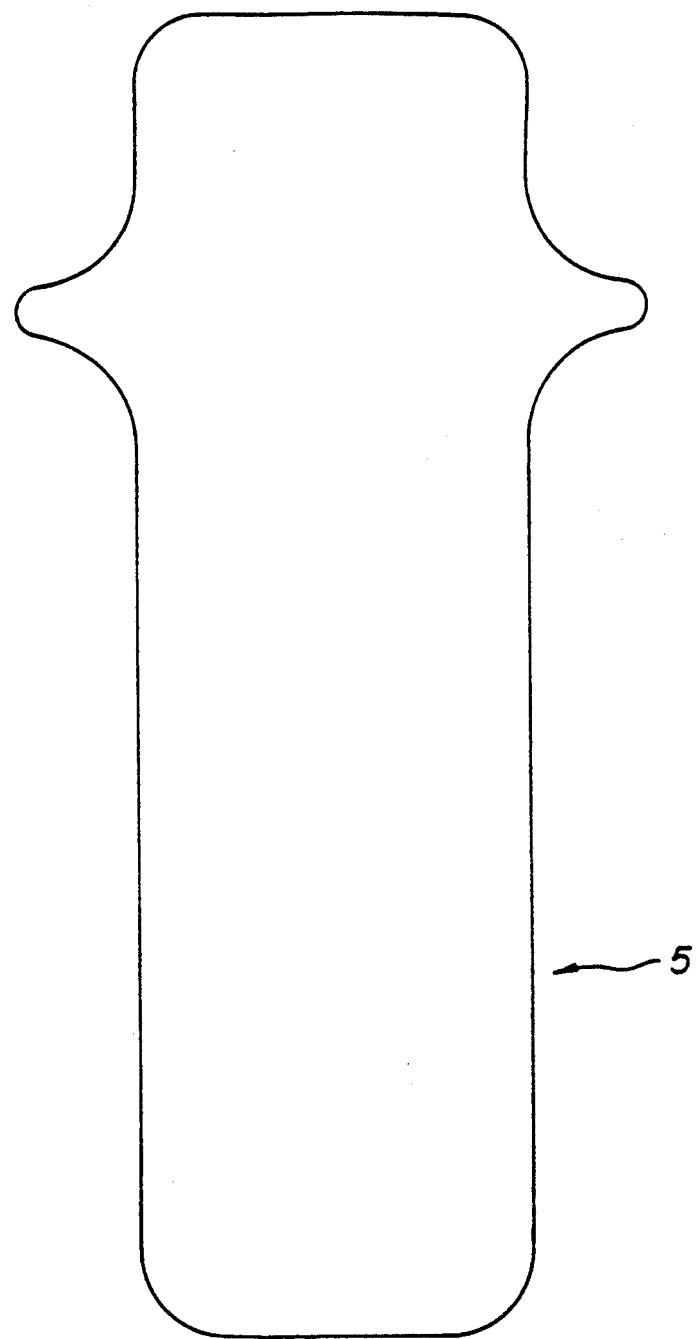
FIG. 9 is a plan view of a further different embodiment of the grip.
Figure 10:
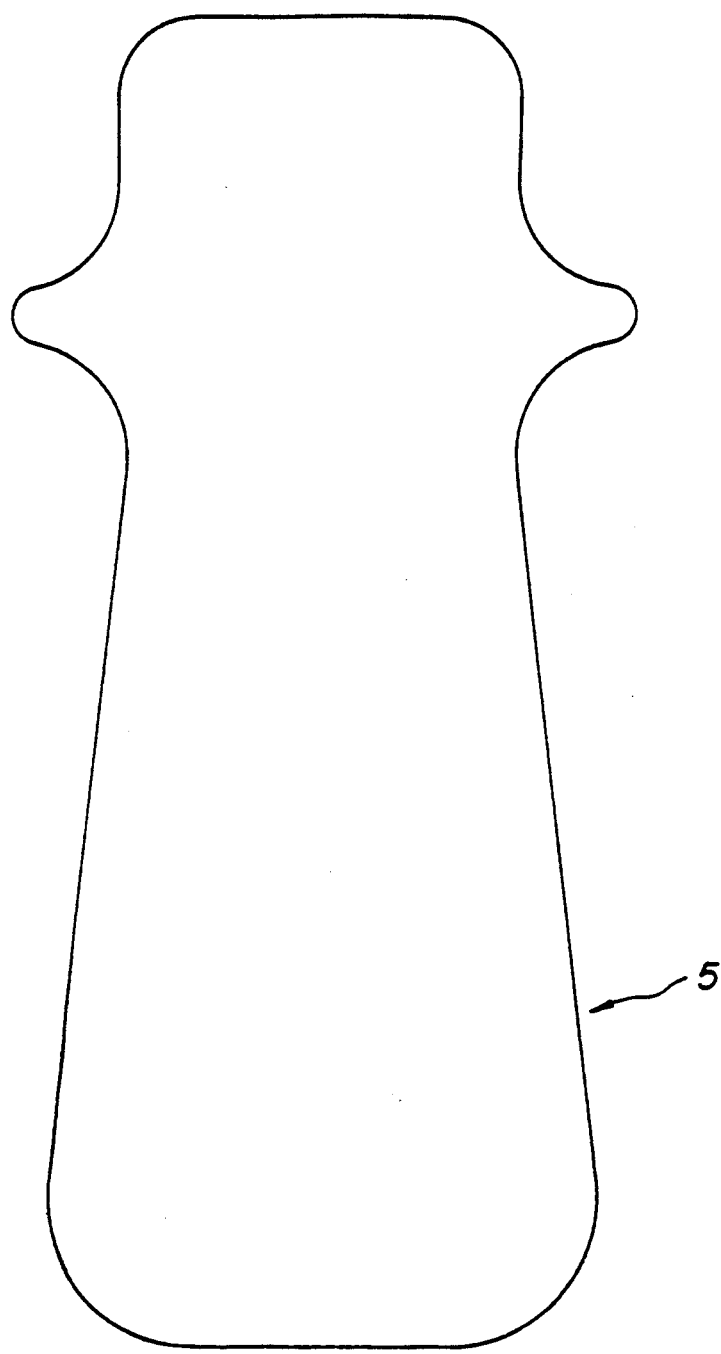
FIG. 10 is a plan view of a still further different embodiment of the grip.

FIGS. 8 through 10 are a plan views of other configurations of grip body 5.

FIG. 8 shows a straight grip body excluding protruded portions at the right and left sides. FIG. 9 shows a grip body in which the width of the base portion is shortened compared to the grip body as shown in FIG. 8. FIG. 10 shows a taper type grip body in which the grip body is tapered from the base end to the tip end. Each grip body 5 has a flat surface at the base portion and the tail portion similarly to the grip body described in the prior embodiments.

I claim:

1. A combined universal head and grip for driving a camera horizontally and vertically, said combined universal head and grip being attached at a lower surface of a body of the camera and comprising:
   a grip body, wherein a width of one part of said grip body is smaller than a width of a remaining portion of said grip body to allow said grip body to serve as a base for a universal head, and
   a driving source for driving the camera horizontally and vertically, said driving source being installed in a tip portion of said grip body.

2. A combined universal head and grip for driving a camera horizontally and vertically, attached at a lower surface of a body of the camera, comprising
   a grip body, said body serving as a base of a universal head and
   a driving source for driving the camera horizontally and vertically, said driving source being installed in a tip portion of the body of the grip,
   wherein the body of the grip is foldably attached to the body of the camera and an axis of folding movement of the body of the grip and an axis of vertical movement of the camera are common.

3. A combined universal head and grip for driving a camera horizontally and vertically, attached at a lower surface of a body of the camera, comprising a grip body, said body serving as a base of a universal head and a driving source for driving the camera horizontally and vertically, said driving source being installed at a tip portion of the body of the grip, wherein the body of the grip is foldably attached with respect to the body of the camera, and the shape of the body of the grip is flat, and a longitudinal direction of the body of the grip is substantially perpendicular to an optical axis of the camera when the grip is unfolded.

4. A combined universal head and grip as claimed in claim 3, wherein a width of one part of said body of said grip is smaller than a width of remaining portion of said grip.

5. A combined universal head and grip as claimed in any one of claims 1 through 3, further comprising a tilt driving force transmitting means for transmitting a driving force of a tilt driving source wherein said tilt driving force transmitting means is swingably engaged with said camera body when said grip is folded.

6. A combined universal head and grip as claimed in claim 5, wherein said tilt driving force transmitting means is engaged with said body of said camera via a friction clutch.

7. A combined universal head and grip as claimed in claim 6, wherein said tilt driving force transmitting means includes a plurality of gears and a tilt arm.

8. A combined universal head and grip as claimed in claim 7, further comprising a pan driving force transmitting means for transmitting a driving force of a pan driving source, said pan driving force transmitting means comprising a plurality of gears.

9. A combined universal head and grip for driving a camera horizontally and vertically, said combined universal head and grip being attached at a lower surface of a body of the camera, and comprising:

a grip body, said grip body serving as a base for a universal head, a driving source for driving the camera horizontally and vertically, said driving source being installed in a tip portion of said grip body, and a tilt driving force transmitting means for transmitting a driving force of a tilt driving source, wherein said tilt driving force transmitting means is swingably engaged with said camera body when said grip body is folded.

10. A combined universal head and grip as claimed in claim 9, wherein said tilt driving force transmitting means is engaged with said body of said camera via a friction clutch.

11. A combined universal head and grip as claimed in claim 10, wherein said tilt driving force transmitting means includes a plurality of gears and a tilt arm.

12. A combined universal head and grip as claimed in claim 11, further comprising a pan driving force transmitting means for transmitting a driving force of a pan driving source, said pan driving force transmitting means comprising a plurality of gears.

* * * * *